United States Patent

[11] 3,591,198

| [72] | Inventor | Gerard Brando<br>8 rue Edgard Quinet, Saint Etienne, Loire, France |
|------|----------|---|
| [21] | Appl No | 747,264 |
| [22] | Filed | July 24, 1968 |
| [45] | Patented | July 6, 1971 |
| [32] | Priority | July 26, 1967, May 7, 1968 |
| [33] | | France |
| [31] | | 9,794 and 68/107 |

[54] RESILIENT SUSPENSION FOR INDEPENDENTLY SPRUNG WHEELS
11 Claims, 8 Drawing Figs.

| [52] | U.S. Cl. | 280/124, 267/20 |
|------|----------|---|
| [51] | Int. Cl. | B60g 3/14 |
| [50] | Field of Search | 280/124; 267/20, 60 |

[56] References Cited
UNITED STATES PATENTS

| 2,160,608 | 5/1939 | Watson | 280/124 X |
| 2,507,980 | 5/1950 | Knapp | 280/124 |
| 2,549,320 | 4/1951 | Makin | 280/124 X |
| 2,738,542 | 3/1956 | Clark, Jr. | 280/124 X |
| 2,872,210 | 2/1959 | Shaffer | 280/124 |

Primary Examiner—A. Harry Levy
Attorney—Waters, Roditi, Schwartz & Nissen

ABSTRACT: A mechanical, independent, resilient suspension for any kind of vehicle in which a transverse axle rigid with the longitudinal bearers of the vehicle chassis supports at opposite projecting journal portions, an articulated link plate of triangular form the rear end of which externally supports a wheel-supporting stub axle, whereas the front end is connected to one end of the compression coil spring the other end of which is secured to the corresponding longitudinal bearer.

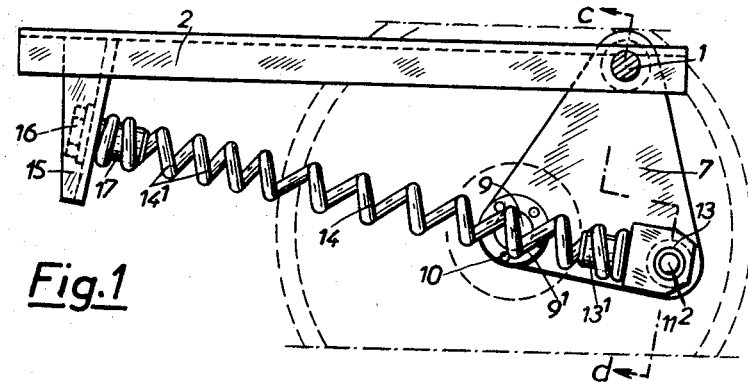
Fig.1
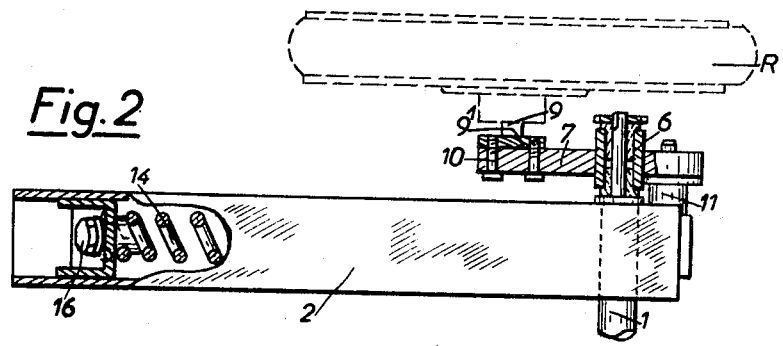
Fig.2
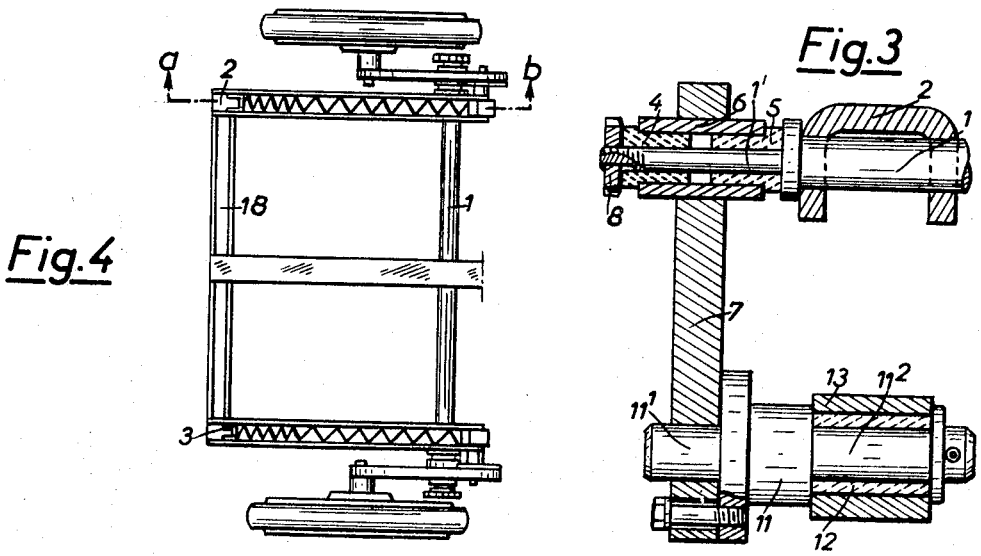
Fig.3
Fig.4

RESILIENT SUSPENSION FOR INDEPENDENTLY SPRUNG WHEELS

BRIEF SUMMARY OF THE INVENTION

The present invention relates to a mechanical resilient suspension for independently sprung wheels in any kind of vehicle.

In accordance with the invention, the suspension is mounted between a wheel-supporting member and a chassis member of a vehicle, said suspension comprising a link plate pivotably supported on said wheel-supporting member and supporting a wheel to provide pivotal movement thereof relative to said wheel-supporting member as said link plate undergoes pivotal movement, and spring means between said plate and chassis member to yieldably resist pivotal movement of said link plate relative to said wheel-supporting member.

This suspension has great operational flexibility and can easily be adapted to any kind of vehicle.

Several embodiments of the invention are illustrated in the accompanying drawing by way of example and not of limitation.

BRIEF DESCRIPTION OF THE DRAWING

FIG. 1 is a sectional view of the suspension taken on line 6–6 b of FIG. 4,

FIG. 2 is a plan view of the suspension of FIG. 1 partially broken away,

FIG. 3 is a sectional view on a larger scale taken on the discontinuous line c–d of FIG. 1, FIG. 4 is a diagrammatic plan view on a reduced scale of the suspension for a pair of wheels.

DETAILED DESCRIPTION

Figure 7:
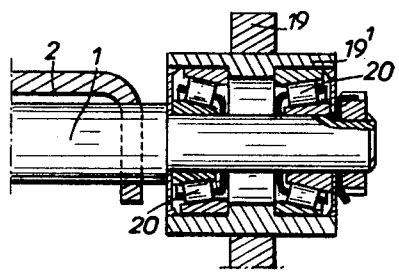
FIG. 7 is a sectional view on a larger scale taken on the line e–f of FIG. 5.

The suspension according to the invention is constructed with a transverse axle 1 connecting and coupling longitudinal bearers 2 and 3 of the chassis and projecting laterally therebeyond at its ends to receive at each side of the chassis a flexible independent suspension supporting a corresponding wheel.

For this purpose, each end of the transverse axle 1 constitutes a journal $1^1$ on which rotate opposed shouldered rings 4 and 5 made of an appropriate self-lubricating material, which are centered at each side in the bore of a tubular sheath 6 fixed transversely in a corresponding aperture of a link plate 7. A check nut 8 is screwed on the threaded end of the journal $1^1$ to secure the joint in a transverse direction.

The link plate 7 is of triangular shape and it supports at its rear outer face a stub axle 9 adapted for the mounting of the wheel R. The stub axle 9 is constructed with a shouldered base element $9^1$ which is secured to the link plate 7 by an annular arrangement of fixing screws 10. This mounting of the wheel R on the said axle 9 is carried out in known manner.

At its opposite lower end, the link plate 7 is perforated to receive a cylindrical nose $11^1$ of a transverse shaft 11. The shaft 11 has a shouldered journal $11^2$ which permits the engagement and free rotation of a ring 12 made of self-lubricating material of an appropriate type, within a corresponding bore of a support 13 adapted for being secured to the end of a coil spring 14.

For this purpose, the support 13 includes a cylindrical head $13^1$ preferably having at its periphery a helical groove of semicircular cross section to permit the screwing of the end turns of the spring 14 thereon.

At the opposite end of the corresponding bearer 2 or 3 there is fixed, by welding or the like, a bearing strap 15 within the U-shaped internal cross section of the bearer. The bearing strap 15 is arranged at an angle as shown in FIG. 1 and is perforated longitudinally to permit the fixing of a cylindrical block 17 by a bolt 16. The block is also preferably provided at its periphery with a helical groove to permit the opposite rear end of the coil spring 14 to be fixed thereto by screwing. The spring 14 extends along a line which intersects the axis of rotation of the wheel when the suspension is unloaded as is apparent from FIG. 1.

It should be noted that the turns $14^1$ of coil spring 14 at the rear thereof, are more closely spaced over a given length than the other turns for acting in compression under a small load, whereas the more widely spaced turns then come to act when the applied force is greater.

It will be apparent that these arrangements, which are applicable to each wheel R, may be adapted either directly to the original longitudinal bearers of the vehicle or to a "false frame" as illustrated in FIG. 4. In this case the longitudinal bearers 2 and 3 are connected on the one hand by the transverse axle 1 and on the other hand by an end crossmember 18.

According to these arrangements, it will be appreciated that when a load occurs or the wheel R passes through a rut, the link plate 7 pivots about the transverse axle 1, compressing the coil spring 14 which acts as a shock absorber so as to ensure a flexible suspension whatever the value of the load.

Figure 6:
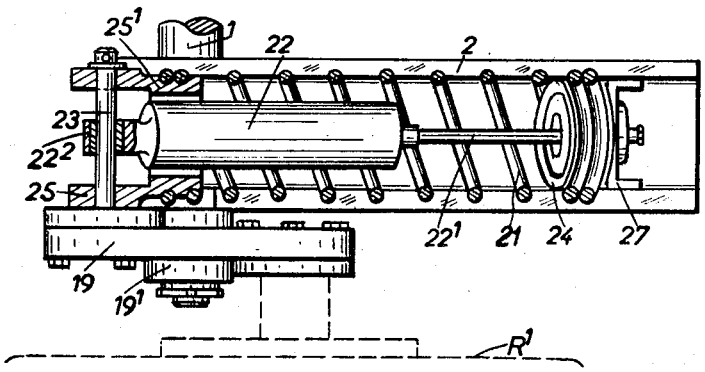
FIG. 6 is a view from below and partly in section of the suspension of FIG. 5.
Figure 5:
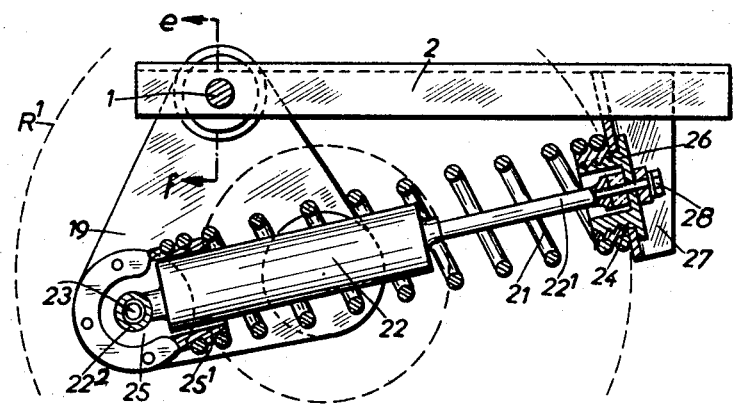
FIG. 5 is an elevation view partly in section and on enlarged scale, of a modified constructional form of the suspension.

In the modified constructional form illustrated in FIGS. 5, 6 and 7, showing a resilient suspension intended for greater loads, the same arrangement is found again, but the articulation of each link plate 19 relative to the transverse axle 1 is effected through the agency of roller bearings 20 accommodated in corresponding chambers of a tubular sheath $19^1$.

On the other hand, in this embodiment there is added internally of the coil spring 21 corresponding to each wheel $R^1$ a hydraulic shock absorber 22 the body of which is fixed to a transverse shaft 23, whereas its displaceable rod $22^1$ is secured to a bearing block 24.

For this purpose, a support 25 in the form of a strap is centered by its limbs on the transverse shaft 23 fast with the link plate 19, whereas its cylindrical opposite part $25^1$ is provided with a helical groove to permit the fixing of the end of the coil spring 21 thereto. The support 25 is also provided with an axial bore to permit the free passage of the body of the hydraulic shock absorber 22 whose head $22^2$ is engaged on the transverse shaft 23.

At the opposite side, the rod $22^1$ of the hydraulic shock absorber 22 is held in position by means of a shouldered screw 26 screwed into the interior of the block 24, passing through a bearing strap 27 at the same time. This screw 26 is perforated axially to permit the passage of the rod $22^1$ which is secured by means of washers and a clamping nut 28.

Figure 8:
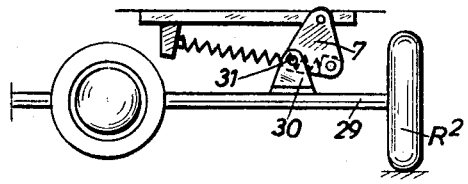
FIG. 8 is a diagrammatic view illustrating a modified arrangement of the resilient suspension.

In FIG. 8 the resilient suspension has been illustrated mounted transversely relatively to the wheels of the vehicle. In this arrangement, the link plate 7 is connected to the shaft 29 supporting the wheel $R^2$ by means of a support 30 pivotably mounted on pivot 31 secured to the link plate 7.

It will be appreciated that this arrangement also permits the flexible suspension of each wheel as regards height.

What I claim is:

1. A resilient suspension mounted between a first wheel member and a second chassis member, said suspension comprising a vertically disposed link plate of triangular shape pivotably connected at two vertex portions thereof respectively to said first and second members, and a spring having one end connected to the link plate at the third vertex portion thereof, said spring having an opposite end connected to said second member and, when the suspension is unloaded, extending across the link plate and passing substantially through the vertex portion at which the link plate is pivotably connected to said first member, said vertex portions being substantially equidistant from one another.

2. A suspension as claimed in claim 1 wherein the suspension further comprises a supporting member pivotably connecting the link plate at one of the first two vertex portions thereof to said second member, the wheel being pivotably connected to the second of said first two vertex portions whereby the link plate provides pivotal movement of the wheel relative to the supporting member and said chassis member, said spring yieldably resisting pivotal movement of the link plate relative to the chassis member.

3. A suspension as claimed in claim 1 wherein the axes of pivotal movement at the connections at said two vertex portions are parallel with each other and perpendicular to said link plate, said one end of the spring being connected to the link plate for pivotal movement about an axis perpendicular to the link plate and parallel to the axes of pivotal movement at the other two vertexes.

4. A resilient suspension mounted between a wheel and a chassis member, said suspension comprising a vertically disposed link plate of triangular shape, a wheel supporting member pivotably connecting the link plate at one vertex portion thereof to said chassis member, said wheel being pivotably connected to said link plate at a second vertex portion thereof, and a spring having one end connected to the link plate at the third vertex portion thereof, said spring having an opposite end connected to the chassis member to yieldably resist pivotal movement of the link plate relative to the chassis member, said spring, when the suspension is unloaded, extending along a line passing substantially through the vertex portion at which the link plate is pivotably connected to the wheel, said spring being a compression spring whose end connected to the chassis member has turns thereat closer together compared to the remainder of the spring.

5. A resilient suspension mounted between a wheel and a chassis member, said suspension comprising a vertically disposed link plate of triangular shape, a supporting member pivotably connecting the link plate at one vertex portion thereof to said chassis member, said wheel being rotatably supported from said link plate at a second vertex portion thereof, and a spring having one end connected to the link plate at the third vertex portion thereof, said spring having an opposite end connected to the chassis member to yieldably resist pivotal movement of the link plate relative to the chassis member, said spring, when the suspension is unloaded, extending along a line passing substantially through the vertex portion at which the link plate is pivotably connected to the wheel, said supporting member comprising an axle including an end portion on which said link is journaled, said chassis member comprising a longitudinal bearer, said end portion of said supporting member extending laterally and beyond the bearer, said wheel being supported from the link plate on a side thereof opposite the bearer.

6. A suspension as claimed in claim 5 wherein said supporting member is arranged at the uppermost vertex portion of the link plate and said spring extends rearwardly from said link plate and is attached thereto at the forward most vertex portion thereof.

7. A suspension as claimed in claim 6 wherein said spring extends longitudinally in the plane of the longitudinal bearer.

8. A suspension as claimed in claim 7 wherein the vehicle has a second wheel and longitudinal bearer, and said suspension comprises a second link plate and a spring therefor.

9. A suspension as claimed in claim 7 wherein the connection of said one end of said spring to said link plate includes a head having helical grooves therein in which end turns of said end of the spring are threadably engaged, and the connection of said opposite end of said spring to said longitudinal bearer includes a head with helical grooves therein in which end turns of the opposite end of the spring are threadably engaged.

10. A suspension as claimed in claim 7 comprising hydraulic shock absorber means mounted within the spring and connected to said link plate and said longitudinal bearer.

11. A suspension as claimed in claim 10 comprising a transverse shaft fixedly secured to said link plate, said shock absorber means comprising a cylinder body mounted on said transverse shaft and a piston rod secured to said longitudinal bearer.